(12) United States Patent
Harada et al.

(10) Patent No.: US 10,980,050 B2
(45) Date of Patent: Apr. 13, 2021

(54) USER TERMINAL, RADIO BASE STATION AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 110 days.

(21) Appl. No.: 15/524,774

(22) PCT Filed: Oct. 9, 2015

(86) PCT No.: PCT/JP2015/078747
§ 371 (c)(1),
(2) Date: May 5, 2017

(87) PCT Pub. No.: WO2016/072221
PCT Pub. Date: May 12, 2016

(65) Prior Publication Data
US 2017/0339714 A1    Nov. 23, 2017

(30) Foreign Application Priority Data
Nov. 6, 2014 (JP) .............................. JP2014-226467

(51) Int. Cl.
*H04W 72/12* (2009.01)
*H04L 5/00* (2006.01)
(Continued)

(52) U.S. Cl.
CPC .......... *H04W 72/1289* (2013.01); *H04J 1/02* (2013.01); *H04J 11/00* (2013.01); *H04L 5/001* (2013.01);
(Continued)

(58) Field of Classification Search
CPC ..... H04L 5/001; H04L 1/0026; H04L 5/0035; H04L 5/0012; H04W 24/10; H04W 52/325; H04W 88/02
See application file for complete search history.

(56) References Cited

U.S. PATENT DOCUMENTS

2010/0159950 A1*  6/2010  Toh ...................... H04J 11/0086
                                                  455/456.1
2011/0274007 A1*  11/2011 Lin ....................... H04W 72/00
                                                  370/254
(Continued)

FOREIGN PATENT DOCUMENTS

| JP | 2012-100110 A | 5/2012 |
|---|---|---|
| WO | 2010/126107 A1 | 11/2010 |
| WO | 2010/150462 A1 | 12/2010 |

OTHER PUBLICATIONS

International Search Report issued in PCT/JP2015/078747 dated Dec. 28, 2015 (2 pages).

(Continued)

*Primary Examiner* — Raj Jain
(74) *Attorney, Agent, or Firm* — Osha Bergman Watanabe & Burton LLP

(57) ABSTRACT

The present invention is designed so that it is possible to reduce the measurement-induced increase of load and power consumption in user terminals even when the number of component carriers that can be configured per user terminal is expanded. A user terminal communicates with a radio base station that configures groups (TAGs) comprised of one or more cells, and has a receiving section that receives information related to component carriers (CCs) included in the groups, and a measurement section that makes measurements on a per group basis based on the information related to the component carriers.

7 Claims, 11 Drawing Sheets

(51) Int. Cl.
*H04W 24/10* (2009.01)
*H04J 11/00* (2006.01)
*H04J 1/02* (2006.01)

(52) U.S. Cl.
CPC .......... *H04L 5/0012* (2013.01); *H04L 5/0091* (2013.01); *H04W 24/10* (2013.01); *H04L 5/0023* (2013.01)

(56) References Cited

U.S. PATENT DOCUMENTS

| | | | |
|---|---|---|---|
| 2012/0099466 A1 | 4/2012 | Aoyama et al. | |
| 2012/0147794 A1* | 6/2012 | Chung | H04L 5/0057 370/280 |
| 2012/0224558 A1* | 9/2012 | Jeong | H04W 72/04 370/330 |
| 2012/0269152 A1* | 10/2012 | Hong | H04L 5/0094 370/329 |
| 2013/0064131 A1* | 3/2013 | Kwon | H04L 5/0007 370/252 |
| 2013/0215866 A1* | 8/2013 | Ahn | H04W 52/04 370/329 |
| 2014/0219185 A1* | 8/2014 | Etemad | H04W 56/0045 370/329 |
| 2015/0045085 A1* | 2/2015 | Kishiyama | H04W 52/241 455/522 |
| 2015/0124743 A1* | 5/2015 | Damnjanovic | H04L 5/0032 370/329 |
| 2017/0339714 A1* | 11/2017 | Harada | H04L 5/001 |

OTHER PUBLICATIONS

Written Opinion of the International Searching Authority issued in PCT/JP2015/078747 dated Dec. 28, 2015 (4 pages).

Ericsson; "Analysis of UE behaviour after measurement gap"; 3GPP TSG RAN WG4 Meeting #69, R4-136686; San Francisco, US; Nov. 11-15, 2013 (6 pages).

3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

Office Action issued in the counterpart Japanese Patent Application No. 2016-557522, dated Sep. 15, 2020 (8 pages).

* cited by examiner

| TAG ID | CC INDEX |
|---|---|
| TAG #1 | CC#1, #2 |
| TAG #2 | CC#3, #4 |
| TAG #3 | CC#5~#10 |

FIG. 5A

| TAG ID | CC INDEX | REPRESENTATIVE CC |
|---|---|---|
| TAG #1 | CC#1, #2 | CC#1 |
| TAG #2 | CC#3, #4 | CC#3 |
| TAG #3 | CC#5~#10 | CC#7 |

FIG. 5B

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Furthermore, a successor system of LTE—referred to as "LTE-advanced" (also referred to as "LTE-A")—has been under study for the purpose of achieving further broadbandization and increased speed beyond. LTE, and the specifications thereof have been drafted as LTE Rel. 10/11.

Also, the system hand of LTE Rel. 10/11 includes at least one component carrier (CC), where the LTE system band constitutes one unit. Such bundling of a plurality of CCs into a wide band is referred to as "carrier aggregation" (CA). Also, in LTE Rel. 11, multiple timing advance (MTA), which enables varying timing control between CCs, is introduced. This introduction of MTA has made it possible to implement CA in a plurality of CCs formed with a plurality of transmitting/receiving points that are placed in different locations in effect (for example, radio base stations and RRHs (Remote Radio Heads)).

Furthermore, in LTE Rel. 12, which is a more advanced successor system of LTE, various scenarios to use a plurality of cells in different frequency bands (carriers) are under study. For example, studies are in progress to apply CA, which adopts above-noted MTA, when a plurality of cells are formed by a single radio base station, and, on the other hand, apply dual connectivity (DC) when these multiple cells are formed by completely different radio base stations.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In CA in the above-mentioned successor systems of LTE (LTE Rel. 10 to 12), the maximum number of CCs that can be configured per user terminal (UE) is limited to five. In LTE Rel. 13, which is an even more advanced successor system of LTE, a study is in progress to reduce the limit on the number of CCs that can be configured per UE and configure six or more CCs, in order to make possible even more flexible and faster wireless communication.

However, when the number of CCs that can be configured per UE is expanded to six or above, the load and power consumption that is required of UEs for making various measurements (RRM measurements, CSI measurements, etc.) and establishing synchronization might increase. Consequently, when the number of CCs that can be configured per UE is expanded, how to reduce the measurement-induced increase of load and power consumption in UEs is an important problem.

The present invention has been made in view of the above, and it is therefore an object of the present invention to provide a user terminal, a radio base station and a radio communication method that can reduce the measurement-induced increase of load and power consumption in user terminals even when the number of component carriers that can be configured per user terminal is expanded.

Solution to Problem

According to one aspect of the present invention, a user terminal communicates with a radio base station that configures groups comprised of one or more cells, and has a receiving section that receives information related to component carriers included in the groups, and a measurement section that makes measurements on a per group basis based on the information related to the component carriers.

Advantageous Effects of Invention

According to the present invention, it is possible to reduce the measurement-induced increase of load and power consumption in user terminals even when the number of component carriers that can configured per user terminal is expanded.

BRIEF DESCRIPTION OF DRAWINGS

FIG. 5 provide diagrams to show examples of lists of component carriers in timing advance groups, reported from radio base stations;

DESCRIPTION OF EMBODIMENTS

Figure 1:
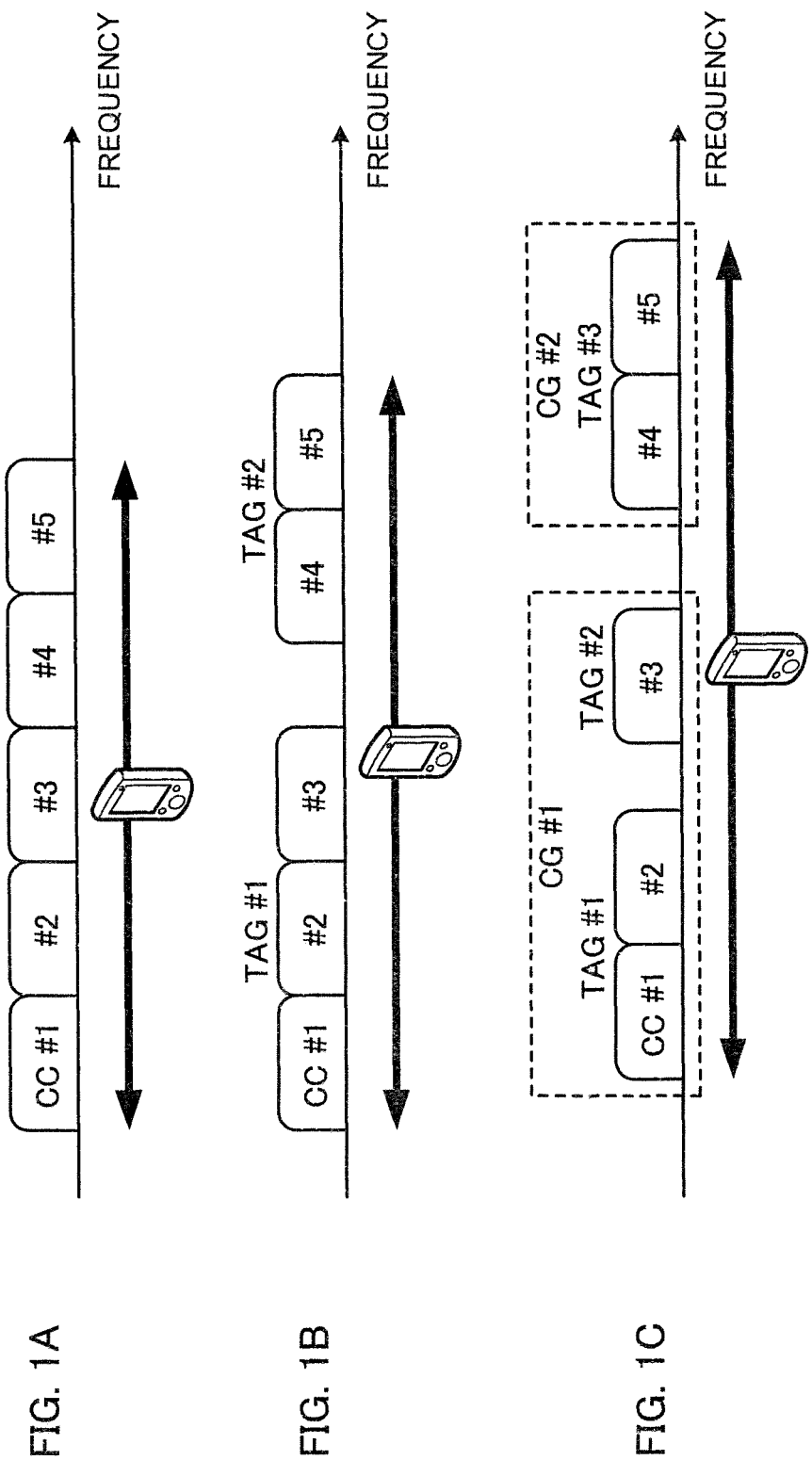
FIG. 1 provide diagrams to explain an overview of carrier aggregation in successor systems of LTE.

FIG. 1 provide diagrams to explain an overview of carrier aggregation in successor systems of LTE (LTE Rel. 10 to 12). FIG. 1A shows an overview of CA in LTE Rel. 10. FIG. 1B shows an overview of CA in LTE Rel. 11. FIG. 1C shows an overview of DC in LTE Rel. 12.

As shown in FIG. 1A, in CA in LTE Rel. 10, high speed data rates are made possible by providing a wide band by bundling maximum five component carrier (CCs) (CC #1 to CC #5), where the LTE system band constitutes one unit.

As shown in FIG. 1B, in CA in LTE Rel. 11, multiple timing advance (MTA), which enables varying timing control between CCs, is introduced. CA that employs MTA provides support for timing advance groups (TAGs), which are classified by the timing of transmission. Then, one radio base station's scheduler controls signal transmission timings on a per TAG basis. By this means, CA between a plurality of CCs formed by radio base stations that are in effect placed in the same location, like a radio base station and an RRH (Remote Radio Head) that is connected with this radio base station via ideal backhaul that implements high-speed channels, such as optical fiber.

In FIG. 1B, CC #1 to CC #3 are allocated to TAG #1, and CC #4 and CC #5 are allocated to TAG #2. In CA to MTA like this, for example, the transmission timings of signals transmitted in CC #1 to CC #3 (TAG #1) formed by a radio base station and signals transmitted in CC #4 and CC #5 (TAG #2) formed by an RRH connected with this radio base station are controlled, and communication is made with user terminals (UE).

As shown in FIG. 1C, in LTE Rel. 12, dual connectivity (DC), which provides a wide band by bundling cell groups (CGs) that are each comprised of one or more cells formed by a plurality of radio base stations, is under study to be introduced. In DC, the timings to transmit signals are adjusted between the schedulers provided in each of a plurality of radio base stations. By this means, it is possible to implement concurrent communication that uses CCs included in separate CGs formed by radio base stations that are placed in completely different locations. Also, in DA, CA to use MTA can be employed concurrently. By this means, for example, concurrent communication to include CA that uses CCs formed by radio base stations placed in different locations and CCs formed by RRHs connected with any one or more of the radio base stations can be realized. Consequently, more flexible communication with UEs can be realized, in comparison with CA in LTE Rel. 11.

In FIG. 1C, CC #1 to CC #3 are allocated to CG #1, and CC #4 and CC #5 are allocated to CC #2. Also, while, CC #1 and CC #2 are allocated to TAG #1 and CC #3 is allocated to TAG #2 in CG #1, CC #4 and CC #5 are allocated to TAG #2 in CC #2. In DC, in which CA to employ MTA is included like this, for example, the transmission timings of signals transmitted in CC #1 to CC #3 (CC #1) formed by a first radio base station and an RRH connected therewith, and signals transmitted in CC #4 and CC #5 (CG #2) formed by a second radio base station are controlled between the schedulers of each radio base station, and communication is made with UEs.

In CA in these successor systems of LTE (LTE Rel. 10 to 12), the maximum number of CCs that can be configured per UE is limited to five. Meanwhile, in LTE Rel. 13, which is a more advanced successor system of LTE, a study is in progress to soften the limit on the number of CCs that can be configured per UE, and allow six or more CCs to be configured. More flexible and faster radio communication is expected to be made possible by thus reducing the limit on the number of CCs that can be configured per UE. Furthermore, there is an expectation to achieve high bandwidth by using a large number of CCs not only in licensed bands, which are bands in which specific operators are allowed exclusive use, but also in unlicensed bands, which are bands which are not limited to specific operators and in which radio base stations can be provided, in high-frequency bands, and so on.

Figure 2:
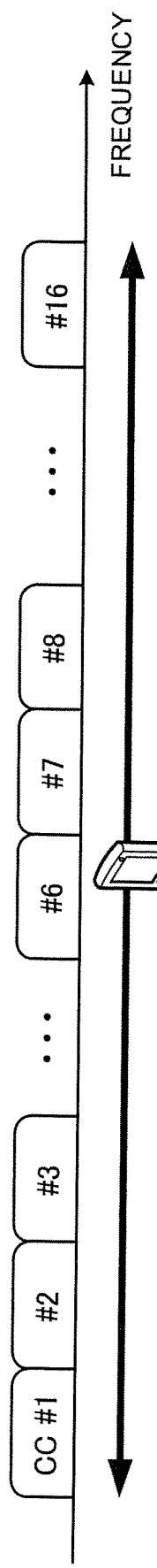
FIG. 2 is a diagram to explain component carriers in carrier aggregation being studied under LTE Rel. 13.

FIG. 2 is a diagram to explain CCs in CA that, is under study in LTE Rel. 13. As shown in FIG. 2, for example, LTE Rel. 13 is planned to configure 16 CCs (CC #1 to CC #16) UE. In this case, communication with UEs can be made by using a bandwidth of maximum 320 MHz. By this means, for example, the number of CCs to use in communication can be increased/decreased or changed, so that flexible and faster radio communication can be realized.

However, when the number of CCs that can be configured per UE is expanded to six or more, the load and power consumption that are required of UEs for measurements are likely to increase. As used herein, "measurements" means that a UE receives detection/measurement signals (for example, the PSS (Primary Synchronization Signal), the SSS (Secondary Synchronization Signal), the CRS (Cell-specific Reference Signal), the CSI-RS (CSI (Channel State Information)-Reference Signal), etc.), discovers these detection/measurement signals, and measures their received quality. Note that the received quality to be measured in the UE is, for example, the RSRP (Reference Signal Received Power), the RSRQ (Reference Signal Received Quality), the SINR (Signal to Interference plus Noise Ratio) and so on. Since these measurements need to be made on a per CC basis, the number of times to make measurements and the time required therefor are likely to increase in proportion to the number of CCs.

Meanwhile, in CA, all secondary cells (SCells) are synchronized with the primary cell (PCell). Consequently, CCs that have different transmission timings due to varying propagation delays and/or other factors can be grouped into TAGs. Furthermore, in CA, when a plurality of CCs are used in a given transmission point, generally, CCs that are consecutive in the frequency domain are used.

The present inventors have focused on these features of CA, and come up with the idea that, when the number of CCs that can be configured per UE is expanded to six or more, it may be possible to reduce the increase of load and power consumption in UEs by controlling the measurement process per group that is comprised of one or more cells (hereinafter referred to as "CC group"), not per CC. To be more specific, the present inventors have conceived of: (1) making measurements per CC group, based on information related to CCs included in CC groups, transmitted from radio base stations; and (2) making measurements based on information related to CCs included in CC groups, and based on CC group-specific, varying measurement gap configurations. For the CC groups here, for example, TAGs that are supported in MTA may be employed. However, the CC groups are by no means limited to TAGs, and changes may be made as appropriate. For example, CGs that are supported in DC may be employed as well. In the following description, cases will be described in which TAGs are employed as CC groups.

Now, the present embodiment will be described the following in detail. Note that cases will be described in the following description where, for ease of explanation, the number of CCs that can be configured per UE when CA is executed is 10. However, in the radio communication system according to the present embodiment, the number of CCs that can be configured per UE, is not limited to this and can be changed as appropriate. Note that, in the following description, CA in which the number of CCs that can be configured per UE is six or more will be referred to as "enhanced CA," for ease of explanation.

Also, assume that, in the following description, a plurality of radio base stations (eNB1 to eNB3) are connected via ideal backhaul that implements high-speed channels, such as optical fiber, for ease of explanation. However, enhanced CA is equally applicable to cases where a plurality of radio base stations (eNB1 to eNB3) are connected via non-ideal backhaul that produces significant delays, such as the X2 interface.

Figure 3:
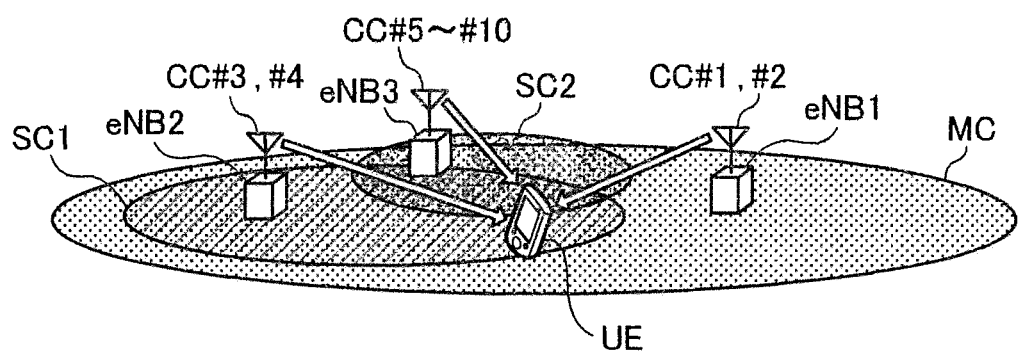
FIG. 3 is a diagram to show an example of a schematic structure of a radio communication system according to the present embodiment.

FIG. 3 is a diagram to show an exemplary radio communication system network structure according to the present embodiment. Radio base station eNB1 is, for example, a macro base station having a relatively wide coverage, and forms a macro cell C1. Radio base station eNB2 is, for example, a small base station having a localized coverage, and forms a small cell SC1. Radio base station eNB3 is a small base station having an even more localized coverage, and forms a small cell SC2. These radio base stations eNB1 to eNB3 are connected via ideal backhaul.

The UE is connected with these three cells (macro cell MC and small cells SC1 and SC2). For example, the UE can communicate with radio base station eNB1 in CCs #1 and #2. Also, the UE can communicate with radio base station eNB2 in CCs #3 and #4. Furthermore, the UE can communicate with radio base station eNB3 in CCs #5 to #10. In enhanced CA, a wide band is provided by bundling these CCs #1 to #10.

In the environment in which radio base stations eNB1 to eNB3 are connected via ideal backhaul, one scheduler (to be more specific, the scheduler provided in radio base station eNB1) can control the scheduling of a plurality of cells (macro cell MC and small cells SC1 and SC2). In this case, the scheduler provided in radio base station eNB1 configures timing advance groups (TAGs) in these CCs #1 to #10, controls transmission timings in accordance with these TAGs.

Figure 4:
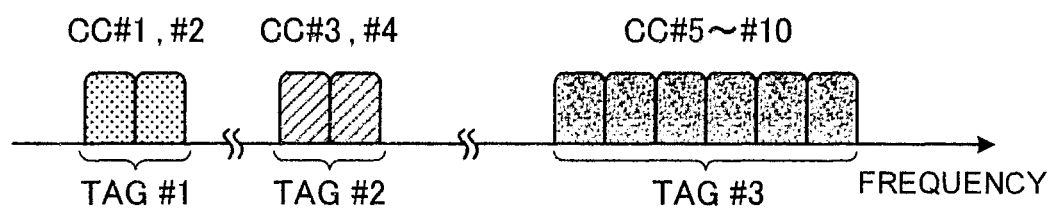
FIG. 4 is a diagram to show examples of timing advance groups configured in the radio communication system shown in FIG. 3.

FIG. 4 is a diagram to show examples of TAGs configured in the radio communication system shown in FIG. 3. As shown in FIG. 4, for example, scheduler provided in radio base station eNB1 can configure TAG #1 in CCs #1 and #2. Similarly, the scheduler provided in radio base station eNB1 can configure TAG #2 in CCs #3 and #4, and configure TAG #3 in CCs #5 to #10.

First Example

Characteristics of the first example of the present invention include that information related to CCs ("CC information") that are included in each TAG is transmitted from radio base stations (for example, radio base station eNB1) to UEs, and, based on this CC information, the UEs make measurements on a per TAG basis. Now, the control of radio base stations and UEs according to the first example will be described below.

Prior to communication in enhanced CA, radio base station eNB1 transmits information about the CCs included in each TAG to a UE. For example, radio base station eNB1 transmits a list that allows the UE to identify the CCs included in each TAG (hereinafter referred to as the "TAG-CC list"). For example, radio base station eNB1 can report the TAG-CC list in higher layer signaling. However, the signal for reporting the TAG-CC list to the UE is not limited to this. For example, the TAG-CC list may be reported to the UE together with the measurement object for each CC, by higher layer signaling.

FIG. 5 provide diagrams to show examples TAG-CC lists that may be reported from radio base station eNB1. FIG. 5 show lists of CCs configured in TAGs in the way shown in FIG. 4. As shown in FIG. 5A, in a TAG-CC list, TAG IDs, which are TAG identification information, and CC indices associated with these, are included. CCs #1 and #2 are associated with TAG #1. Similarly, CCs #3 and #4 are associated with TAG #2, and CCs #5 to #10 are associated with TAG #3.

Upon receiving a TAG-CC list like this, the UE makes measurements, on a per TAG basis, based on the information about the CCs included in each TAG. When receiving the TAG-CC list shown in FIG. 5A, for example, the UE makes measurements once for TAG #1, which includes CCs #1 and #2. Similarly, the UE makes measurements once for TAG #2, which includes CCs #3 and #4, and makes measurements once for TAG #3, which includes CCs #5 to #10. Note that, given the premise that measurements are made for every TAG, the number of times to make measurements is by no means limited to one.

Figure 6A:
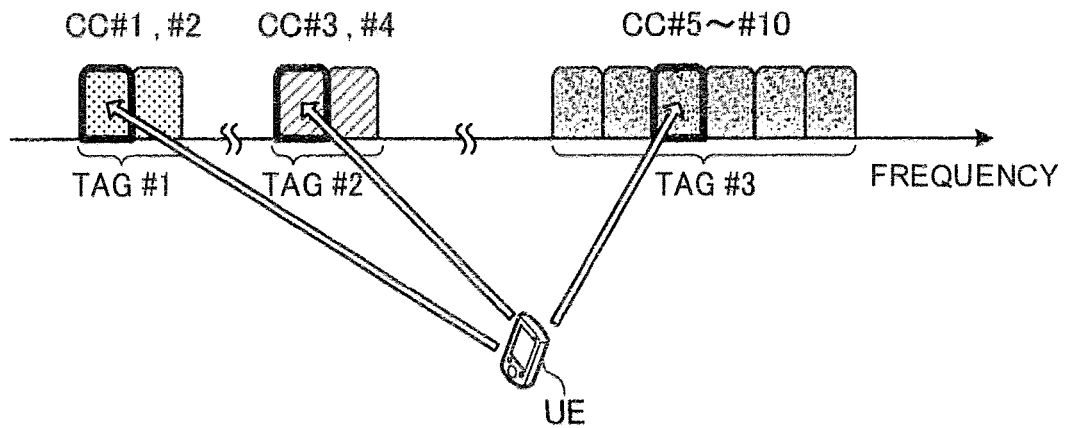
FIG. 6 provide diagrams to show examples of specific component carriers in which measurements are made by a user terminal.

When making measurement on a per TAG basis, the UE can make measurement for specific CCs based on the information about the CCs to included in each TAG. FIG. 6 is a diagram to show examples of specific CCs for which the UE makes measurements. As shown in FIG. 6A, for example, the UE can make measurements for CCs that serve as representatives (representative CCs) of the CCs included in TAGs #1 to #3. FIG. 6A shows a case where CC #1 included in TAG #1, CC #3 included in TAG #2 and CC #7 included in TAG #3 are selected as representative CCs.

The representative CCs for which the UE makes measurements can be selected freely. For example, when the CCs included in each TAG are two consecutive CCs, the CC at the top can be selected as a representative CC (TAGs #1 and #2 shown in FIG. 6A). Also, when the CCs included in each TAG are three or more consecutive CCs, a CC that is placed near the center of the frequency band can be selected as a representative CC (TAG #3 in FIG. 6A).

Figure 6B:
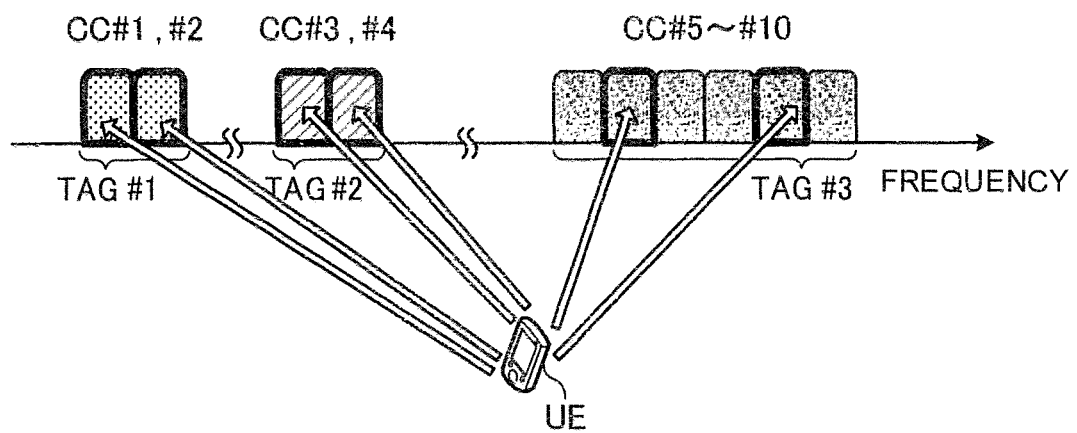

Furthermore, if the UE can make measurements for a plurality of CCs in a TAG by performing the measurement process once, as shown in FIG. 6B, a plurality of CCs included in each TAG can be selected as representative CCs. FIG. 6B shows a case where the UE makes measurements for two CCs by performing the measurement process once. FIG. 6B shows a case where both of CCs #1 and #2 included in TAG #1, both of CCs #3 and #4 included in TAG #2 and CCs #6 and #9 included in TAG #3 are selected as representative CCs.

After having made measurements for these representative CCs, the UE can report the measurement results of all representative CCs, for which measurements have been made, to radio the base station eNB1. Also, it is equally possible to report the measurement result of the representative CC where the measurement result shows the worst performance, among the representative CCs. By reporting the measurement result of the representative CC where the measurement result shows the worst performance, it is possible to reduce the volume of uplink signal traffic required for the reporting. Note that the measurement results constitute information related to measurements.

By receiving such measurement results in reports, radio base station eNB1 can specify the CCs that can be used in communication with the UE. For example, when the measurements results of all the representative CCs where measurements have been made are received, radio base station eNB1 can use, for communication, the CCs in a TAG if a representative CC included therein shows a better measurement than a predetermined threshold. On the other hand, when, among the representative CCs where measurements have been made, the measurement result of the representative CC where the measurement result shows the worst performance is received, if this representative CC's measurement result is better than a predetermined threshold, radio base station eNB1 can use any of the CCs included in the TAGs for communication.

In this way, in the radio communication system according to the first example, the UE receives information about the CCs included in each TAG from radio base station eNB1, and makes measurements on a per TAG basis based on this CC information. By this means, it is possible to reduce the number of CCs that are subject to measurements compared to when measurements are made on a per CC basis. As a result of this, even when the number of CCs that can be configured per UE is expanded by CA, it is still possible to reduce the measurement-induced increase of load and power consumption in UEs.

Note that a case has been described with the above description where a UE makes measurements by selecting representative CCs based on information about the CCs included in each TAG with reference to a TAG-CC list. However, the representative CCs for which UE makes measurements can be specified on the radio base station eNB1 side as well. For example, radio base station eNB1 can include representative CCs in the TAG-CC list, and select these representative CCs (see FIG. 5B).

In the TAG-CC list shown in FIG. 5B, in addition to the information shown in FIG. 5A, representative CCs are linked to each TAG. To be more specific, CC #1 is linked to TAG #1 as a representative CC. Similarly, CC #3 is linked to TAG #2 as a representative CC, and CC #7 is linked to TAG #3 as a representative CC. When receiving a TAG-CC list like this, the UE makes measurements for each TAG's representative CC. Then, as in the above-described case, the UE reports the measurement results of all (or a part of) representative CCs, for which measurements have been made, to radio the base station eNB1.

In this way, when measurements are made on a per TAG basis by using representative CCs that are specified from the radio base station eNB1 side, the UE can skip the process of selecting representative CCs. By this means, the measurement-induced operational load on the UE can be reduced. Furthermore, the processing time required for measurements can be shortened.

Note that, if the UE can make measurements for a plurality or CCs by performing the measurement process once (see FIG. 6B), it is preferable to report the number of CCs (the number of CCs that can be measured together) from the UE to the radio base station eNB1 side in advance. For example, the UE can report the number of CCs that can be measured, as its capability information, to radio base station eNB1. Upon receiving the number of CCs that can be measured, radio base station eNB1 can, for example, configure the number of representative CCs included in the TAG-CC list to the number of CCs that can be measured. Note that the number of CCs that can be measured together in the UE constitutes information related to measurements.

In this way, the number of representative CCs in the TAG-CC list mirrorss the number of CCs which the UE can measure in one process. Then, the UE makes measurements for a number of representative CCs as specified in the TAG-CC list, and reports their measurement results to radio base station eNB1. By this means, it is possible to specify the CCs that can be used for communication with the UE based on the measurement results of a plurality of CCs from each TAG.

Also, a case has been described with the above description where representative CCs are reported to the UE by way of including representative CCs in the TAG-CC list on the radio base station eNB1 side, and measurements are made for the representative CCs on the UE side.

However, the method in which the UE makes measurements for representative CCs is by no means limited to this example, and can be changed as appropriate. For example, it may be possible configure only representative CCs as the object of measurement, without reporting the TAG-CC list. In this case, the UE can make measurements for representative CCs without acquiring the TAG-CC list, and report the measurement results. Then, upon receiving these measurement results, the radio base station eNB1 (network) side may configure CC groups including these representative CCs.

Here, the measurements to be made by the UE include, for example, RRM (Radio Resource Management) measurements, CSI (Channel State Information) measurements, and so on. Also, the measurements conducted by the UE may include time tracking and frequency tracking, which are necessary for RRM measurements and CSI measurements. By making these measurements, too, on a per TAG basis, on the UE side, it is possible to reduce the increase of load and power consumption due to measurements before and/or after a connection is established with radio base station eNB1.

Also, assuming that a representative CC is included in the TAG-CC list, whether or not the measurement results of the representative CC can be applied to the other CCs in the TAG may be reported from radio base station eNB1, for each of RRM measurements, CSI measurements and the tracking that is necessary for these measurements (time tracking, frequency tracking, etc.). By thus determining in advance to which CCs in a TAG the measurement results of a representative CC can be applied, it is necessary to reduce measurement-related unnecessary processes in the UE, and, consequently, shorten the time required for measurements and reduce the UE's load. When no individual CC, to which the measurement results of a representative CC can be applied, is reported, the UE can apply the measurement results to the other CCs in the TAG.

Also, when a report arrives to the effect that the measurement results of one or both of time tracking and frequency tracking in the representative CC can be applied to the other CCs in the TAG, the UE can understand that the representative CC and the other CCs in the TAG are in a QCL (Quasi-Co-Location) relationship. Note that the same holds when no individual CC, to which the measurement results of one or both of time tracking and frequency tracking in the representative CC can be applied, is reported.

In particular, when the representative CC's measurement result of time tracking can be applied to the other CCs in the TAG, the UE can understand that a QCL relationship is reserved with respect to delay spread and average delay. In this case, for example, the UE may perform signal receiving operations in the other CCs in the TAG by using synchronization timings that are acquired based on the reference signals (the CRS, etc.) of the representative CC.

Also, if the representative CC's measurement result of frequency tracking can be applied to the other CCs in the TAG, the UE can understand that a QCL relationship is reserved with respect to Doppler shift and Doppler spread. In this case, for example, the UE may perform signal receiving operations in the other CCs in the TAG by using frequency offsets that are acquired based on the reference signals (the CRS, etc.) of the representative CC.

Note that a case has been described with the above description where a plurality of radio base stations (eNB1 to eNB3) are connected via ideal backhaul. When, by contrast, a plurality of radio base stations eNB1 to eNB3 are connected via non-ideal backhaul, dual connectivity (DC) is applied to the communication between the UE and radio base stations eNB1 to eNB3. In DC, a plurality of schedulers are provided individually, and these multiple schedulers (for example, the scheduler provided in radio base station eNB1 and the scheduler provided in radio base station eNB2) each control the scheduling of the cells (CCs) included in one or more cell groups (CGs) managed thereunder.

In DC, every radio base station configures a cell group (CG) that is formed with one or a plurality of cells. The CG including the PCell is referred to as the "master cell group (MCG)," and CGs other than the MCG are referred to as "secondary cell groups (SCGs)." The total number of cells to constitute the MCG and SCGs is configured to be equal to or less than a predetermined value (for example, five cells). The radio base station in which the MCG is configured (and which communicates by using the MCG) is referred to as the "master base station" (MeNB: Master eNB), and the radio base stations in which SCGs are configured (and which communicate by using SCGs) are referred to as "secondary base stations" (SeNBs: Secondary eNBs).

With reference to FIG. 4, a case will be considered here where CCs #1 to #4 included in TAG #1 and TAG #2 are assigned to CG #1, and where CCs #5 to #10 included in TAG #3 are assigned to CG #2. Assume that, here, CG #1 is configured as the MCG, where radio base station eNB1 is the master base station, and CG #2 is configured as an SCG, where radio base station eNB3 is a secondary base station.

DC does not presume coordination between radio base stations (for example, between radio base station eNB1 and radio base station eNB3) at an equivalent level to CA. A UE is therefore able to execute downlink L1/L2 control (PDCCH/EPDCCH) and uplink L1/L2 control (UCI (Uplink Control Information) feedback through the PUCCH/PUSCH) independently, on a per CG basis. Consequently, the secondary base station, too, needs a special SCell that has equivalent functions to those of the PCell (for example, the common search space, the PUCCH and so on). A special SCell having equivalent functions to those of the PCell is also referred to as a "PSCell."

In a radio communication system like this, prior to communication in enhanced CA, information about the CCs included in each TAG is transmitted from radio base stations eNB1 and eNB3 to a UE. As in the cases described above, the information about the CCs included in each TAG can be reported to the UE by using TAG-CC lists. Upon receiving the TAG-CC lists from radio base stations eNB1 and eNB3, the UE makes measurements on a TAG basis by measuring representative CCs. Then, the UE reports the measurement results to each radio base station that has transmitted the TAG-CC list.

Note that, in DC, for example, the CC that constitutes the PC II included in CG #1 and the CC that constitutes a PSCell included in CG #2 can be selected as representative CCs. Also, when the UE can measure a plurality of CCs by performing the measurement process once (see FIG. 6B), it is equally possible to select plurality of CCs, including these PCell and PSCell-constituting CCs, as representative CCs. However, the CCs to be selected as representative CCs are by no means limited to these, and can be changed as appropriate.

In this way, even when radio base stations eNB1 to eNB3 are connected via non-ideal backhaul, the UE can receive the information about the CCs included in each TAG from radio base station eNB1, and make measurements, on a per TAG basis, based on this CC-related information. By this means, it is possible to reduce the number of CCs that are subject to measurements compared to when measurements are made on a per CC basis. As a result of this, even when the number of CCs that can be configured per UE is expanded by CA, it is still possible to reduce the measurement-induced increase of load and power consumption in UEs.

Now, generally, when CA is applied between a radio base station and a UE, the UE adds secondary cells (SCells) after making a transition from RRC-idle mode to RRC-connected mode. Consequently, if adding SCells takes time in enhanced CA, communication may be finished before the UE achieves an throughput-improving effect based on CA. Consequently, in a preferable embodiment, the UE makes measurements for cell selection or cell re-selection based on specific frequencies that can be SCell candidates (hereinafter referred to as "SCell candidate frequencies") prior to a transition to RRC-connected mode—in other words, while in RRC-idle mode.

To enable an UE in RRC-idle mode to make such measurements for selecting (re-selecting) SCells, in the radio communication system according to the first example, information related to SCell candidate frequencies is reported from the radio base stations by using broadcast information. The UE in RRC-idle mode, upon receiving this broadcast information, makes measurements for the SCell candidate frequencies for cell selection or cell re-selection. By this means, it is possible to shorten the delay after a transition is made to RRC-connected mode, until the beginning of CA (enhanced CA), and, consequently, allow the UE to achieve a CA-based throughput improving effect.

The UE, in RRC-idle mode, makes measurements (inter-frequency measurements) for selecting (re-selecting) the primary cell (PCell) based on inter-frequency carriers reported in broadcast information. For example, the above-described information of SCell candidate frequencies can be added to and reported with inter-frequency carriers. By thus adding the information related to SCell candidate frequencies to existing inter-frequency carriers, it is possible to realize measurements for selecting (re-selecting) SCells, without changing the existing the measurement process in the UE significantly. Note that the information about SCell candidate frequencies does not have to be reported in broadcast information, and various alternatives can be used. Also, the information related to SCell candidate frequencies is not limited to information that directly specifies SCell candidate frequencies, and may be information that specifies SCell candidate frequencies indirectly, such as indices.

In measurements for these SCell candidate frequencies, softer requirements than the requirements configured in existing RRC-idle mode measurements (measurements for selecting (re-selecting) the PCell) can be configured. For example, the requirements for the number of cells to measure, the time and so on can softened. By thus configuring softer requirements when making measurements are for selecting (re-selecting) SCells, it is possible to reduce the increase of operational load in the UE. Note that these requirements for SCell candidate frequencies may be stipulated in the specification in advance, or may be reported in broadcast information.

Also, as for the threshold that is used in the SCell re-selection operation (for example, measurements for re-selection), a different value than the threshold used in the PCell re-selection operation (for example, measurements for re-selection) can be configured. For example, the threshold for determining whether or not the measurements for the re-selection of SCells can be conducted can be configured with a higher value than the threshold used in the measurements for the re-selection of the PCell. In this case, it is possible to reduce the frequency to make measurements for the re-selection of SCells compared to the measurements for the re-selection of the PCell, so that it is possible to reduce the increase of operational load in the UE.

Furthermore, when measurements are made for SCell candidate frequencies, whether or not to search for nearby cells may be judged based on the quality of cells (SCell candidate cells) known at present based on the measurements of the SCell candidate frequencies, regardless of the quality of the serving cell (PCell). In this case, whether or not search for nearby cell is necessary can be judged independently of the quality of the PCell, so that the SCell re-selection operation can be executed properly even when the PCell shows good quality.

Furthermore, in the SCell re-selection operation (for example, measurements for re-selection), it is possible to compare the quality of SCell candidate cells known at present and the quality of nearby cells, regardless of the quality of the PCell. In this case, search for nearby cells can be made independently of the quality of the PCell, so that the SCell re-selection operation can be executed properly even when the PCell shows good quality.

Note that a case has been described here where the information related to SCell candidate frequencies is reported by using broadcast information. However, the method of reporting the information related to SCell candidate frequencies is by no means limited to this, and can be changed as appropriate. For example, when a transition to RRC-connected mode is made, it is possible to report, by using higher layer signaling, CCs that may be re-selected as SCell candidates in RRC-idle mode.

Second Example

The measurements include inter-frequency measurements and intra-frequency measurements. In inter-frequency measurements, detection/measurement signals that are transmitted in different frequencies from that of the connect cell are received, and the received quality of these detection/measurement signals is measured. On the other hand, in intra-frequency measurements, detection/measurement signals that are transmitted in the same frequency as that of the connect cell are received, and the received quality of these detection/measurement signals is measured.

In the radio communication system shown in FIG. 3, for example, the UE that is connected with radio base station eNB1 (macro base station) (that is, the UE is in RRC-connected mode) switches the receiving frequency in measurement gap s. By this means, radio base station eNB1 can measure the received quality of detection/measurement signals (for example, the SSS, etc.) transmitted in the frequency used by radio base station eNB2 (small base station), detects small cell SC1, and start the connecting process.

Here, the measurement gap s refer to the periods for measuring (detecting) detection/measurement signals that are transmitted by using a different frequency (frequency F2) from the frequency used in the connect cell (frequency F1). In these measurement gaps, a UE stops receiving in the connecting frequency F1, and starts receiving in the other frequency F2. To provide measurement gap s, a predetermined length of time (hereinafter referred to as "MGL" (Measurement gap Length)) is repeated in a predetermined period of repetitions (hereinafter referred to as "MGRP" (Measurement gap Repetition Period)).

In inter-frequency measurements, two measurement gap patterns, which are combinations of the above MGL and MGRP, are stipulated. To be more specific, the first measurement gap pattern, in which the MGL is 6 ms and the MGRP is 40 ms, and the second measurement gap pattern, in which the MGL is 6 ms and the MGRP is 80 ms, are stipulated.

Furthermore, in inter-frequency measurements, gap offset (hereinafter referred to as "GO" (Gap Offset)) is reported to a UE through higher layer signaling (RRC signaling). Here, GO refers to the starting offset from the top of a radio frame to the beginning of a measurement gap (starting offset), and show the measurement gap starting timing.

The UE receives a report of the measurement gap configuration, which includes these measurement gap patterns and GO, via, for example, higher layer signaling. Then, the UE makes inter-frequency measurement in accordance with the measurement gap patterns and GO included in measurement gap configuration. The UE can detect small cells by detecting detection/measurement signals transmitted by using a different frequency (frequency F2) from the connecting frequency (frequency F1) in the MGL specified in by the measurement gap patterns.

Such inter-frequency measurements need to be made on a per CC basis. Since the number of carriers that are subject to inter-frequency measurements increases in enhanced CA, the time it takes to finish all the frequency measurements is likely to be long. In order to reduce the time of inter-frequency measurements necessitated by the increased number of CCs, in the radio communication system according to the second example, a radio base station (for example, radio base station eNB1) transmits information about the CCs included in each TAG and measurement gap configurations, which vary per TAG, to a UE, and the UE makes measurements based on the CC information and measurement gap configurations. Now, the control of radio base stations and UEs according to the second example will be described.

Prior to communication in enhanced CA, radio base station eNB1 transmits information related to the CCs included in each TAG, and measurement gap configurations, which vary on a per TAG basis, to a UE. For example, radio base station eNB1 can report the measurement gap configurations that vary per TAG through higher layer signaling. However, the signal for reporting the measurement gap configurations to the UE is by no means limited to this. Note that the information about the CCs included in each TAG is the same as that described with the first example. Here, assume that radio base station eNB1 transmits a TAG-CC list to the UE.

For example, as measurement gap configurations, radio base station eNB1 can configure a plurality of measurement gap patterns having different MGLs, MGRPs and GOs in association with different TAGs. Note that the values of the MGL, the MGRP and the GO included in a measurement gap pattern can be configured freely. The length of the MGL included in a measurement gap pattern can be configured in proportion to the number of CCs included in each TAG. In this case, the MGL can be reported to the UE, implicitly, based on the number of CCs that are included in each TAG.

Also, radio base station eNB1 may report the number of subframes that are needed to make measurements for each CC included in TAG, to the UE, by using higher layer signaling. For example, the number of subframes that are needed to make measurements for each CC includes DRS (Discovery Reference Signal) occasions. By thus reporting the number of subframes that are needed, the accurate time measurements should be made in the UE can be learned. By this means, it is possible to remove the processing time that is produced by unnecessary measurement control.

Upon receiving such a TAG-CC list and measurement gap configurations, the UE makes measurements per CC included in each TAG, based on the MGL, MGRP and GO configured in the measurement gap configuration. Then, the UE reports each CC's measurement results to radio base station eNB1. Note that the measurement results of CCs may be reported on a per CC basis, or may be reported on a per TAG basis.

Figure 7:
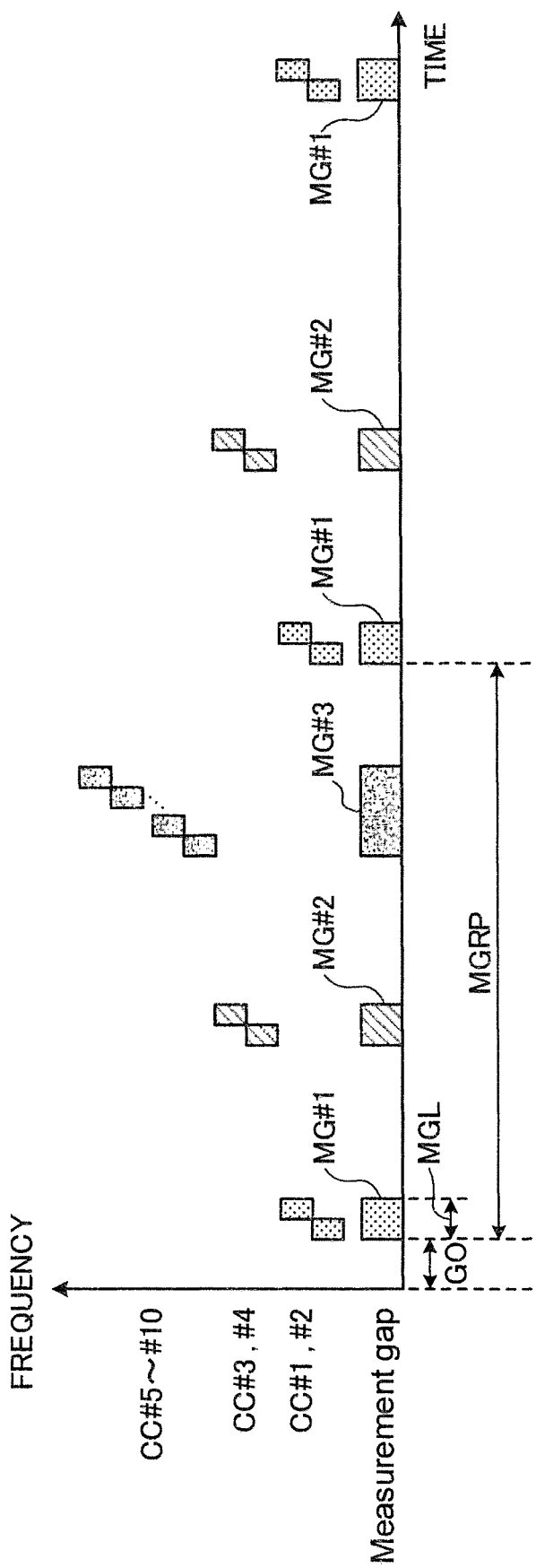
FIG. 7 is a diagram to explain examples of measurement gap s, where measurements are made per component carrier that is included in the timing advance groups shown in FIG. 4.

FIG. 7 is a diagram to explain examples of measurement gap s when measurements are made for each CC included in the TAGs shown in FIG. 4. In FIG. 7, the horizontal axis is time and the vertical axis is frequency. Also, in FIG. 7, the measurement gaps configured in TAGs #1 to #3 are shown as MGs #1 to #3, respectively. Furthermore, in FIG. 7, the MGL, MGRP and GO configured in the measurement gap configuration for MG #1 are shown.

For example, when, starting from the top of the radio frame, the UE reaches the starting timing of MG #1 across the GO, the UE makes measurements for CCs #1 and #2 included in TAG #1 during the MGL. Then, after the first starting timing of MG #1 is over, when, across the MGRP, the UE reaches a second starting timing of MG #1, the UE makes measurements for CCs #1 and #2 included in TAG #1, during the MGL. Similarly, the UE makes measurements for CCs #3 and #4 included in TAG #2 during the MGL of MG #2, and makes measurements for CCs #5 to #10 included in TAG #3 during the MGL of MG #3.

Thus, in the radio communication system according to the second example, the UE receives information about the CCs included in each TAG and measurement gap configurations that vary on a per TAG basis from radio base station eNB1, and makes measurements per CC included in each TAG based on these CC information and measurement gap configurations that vary per TAG. By this means, it is possible to shorten the time required for measurements (inter-frequency measurements) compared to when configuring specific measurement gap configurations in the UE and making measurements on a per CC basis. In particular, it is possible to make inter-frequency measurements efficiently, in minimal gap time. As a result of this, even when the number of CCs that can be configured per UE is expanded by CA, it is still possible to reduce the measurement-induced increase of load and power consumption in UEs. (Structure of Radio Communication System)

Now, the structure of a radio communication system according to an embodiment of the present invention will be described below. In this radio communication system, one of the first example and the second example described above, or a combination of these, can be used.

Figure 8:
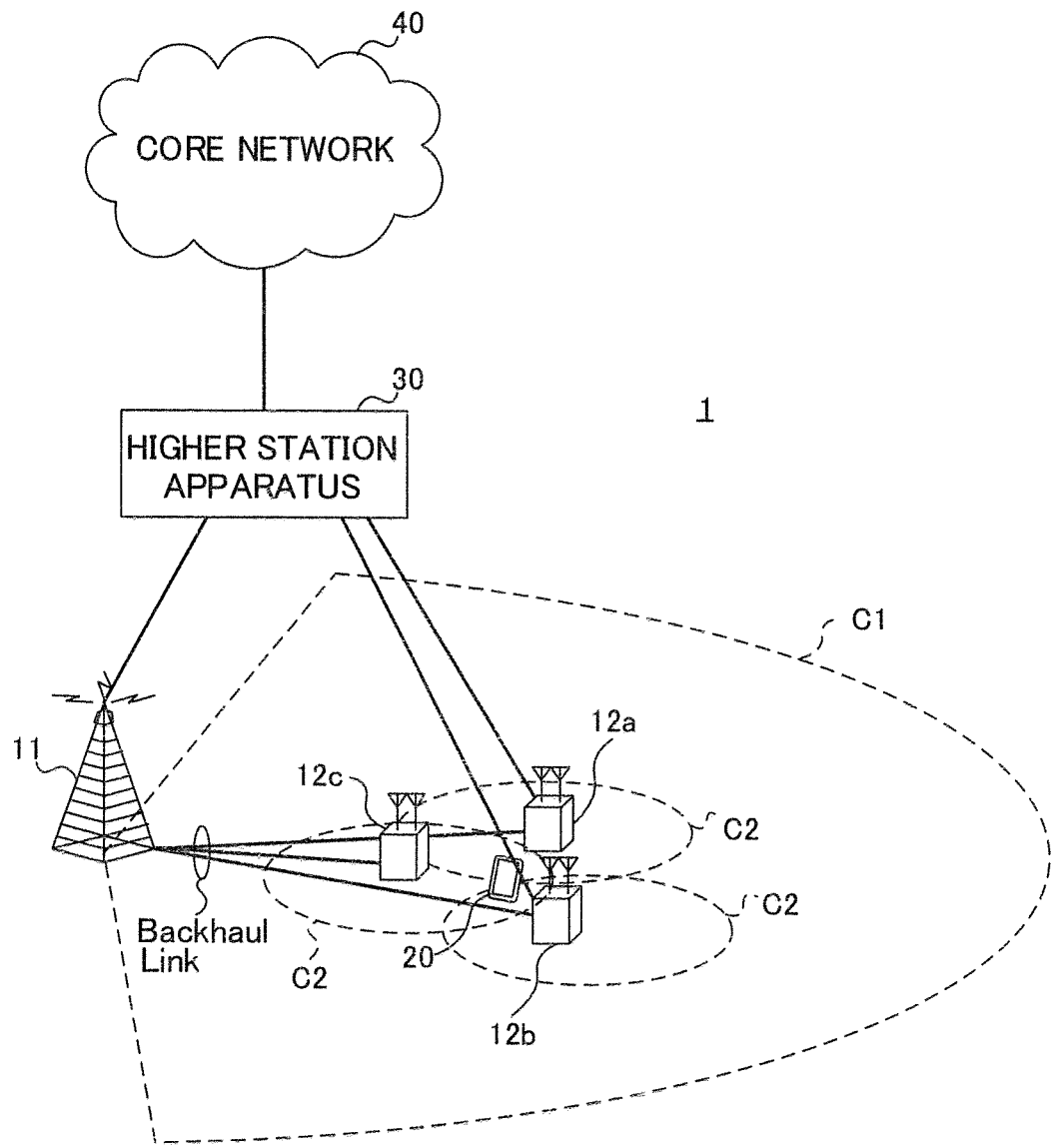
FIG. 8 is a diagram to show an example of a schematic structure of a radio communication system according to the present embodiment.

FIG. 8 is a schematic structure diagram to show an example of a radio communication system according to one embodiment of the present invention. As shown in FIG. 8, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 8, the radio base station 11 is, for example, a macro base station that has a relatively wide coverage, and forms a macro cell C1. The radio base stations 12 (12a to 12c) are, for example, small base stations having local coverages, and form small cells C2. Note that the number of radio base stations 11 and 12 is not limited to that shown in FIG. 8.

The macro cell C1 and the small cells C2 may use the same frequency band or may use different frequency bands. Also, the radio base stations 11 and 12 are connected with each other via an inter-base station interface (for example, optical fiber, the X2 interface, etc.).

Note that the macro base station 11 may be referred to as a "radio base station," an "eNodeB" (eNB), a "transmission point," and so on. The small base stations 12 may be referred to as "pico base stations," "femto base stations," "home eNodeBs" (HeNBs), "transmission points," "RRHs" (Remote Radio Heads) and so on.

The User terminals 20 are terminals to support various communication schemes such as LTE, LTE-A and so on, and may include both mobile communication terminals and stationary communication terminals. The user terminals 20 can communicate with other user terminals 20 via the radio base stations 10.

The higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, synchronization signals, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles (RA preambles) for establishing connections with cells are communicated. Also, a channel quality measurement reference signal (SRS: Sounding Reference Signal) and demodulation reference signals (DM-RSs) for demodulating the PUCCH and the PUSCH are transmitted as uplink reference signals.

Figure 9:
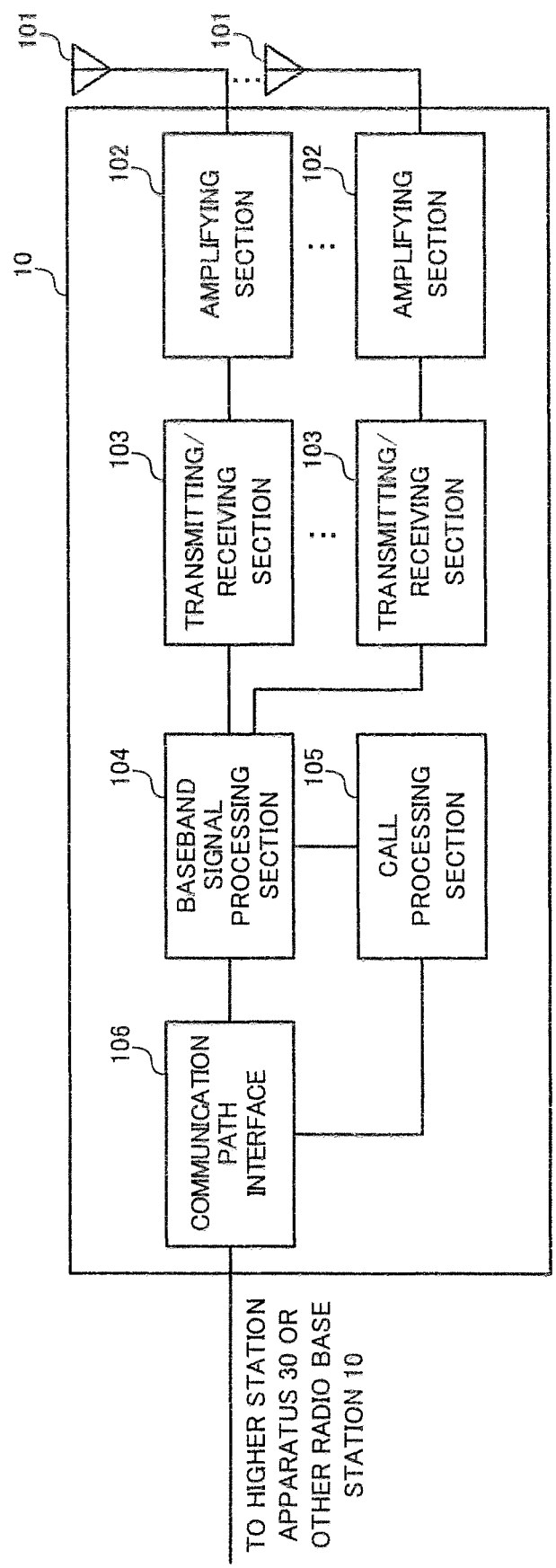
FIG. 9 is a diagram to show an example of an overall structure of a radio base station according to the present embodiment.

FIG. 9 is a diagram to show an example of an overall structure of a radio base station 10 according to present embodiment. The radio base station 10 (which may be either a radio base station 11 or 12) has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 are comprised of transmission sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that are used in the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals to and from neighboring radio base stations 10 (backhaul signaling) via an inter-base station interface (for example, optical fiber, the X2 interface, etc.).

Figure 10:
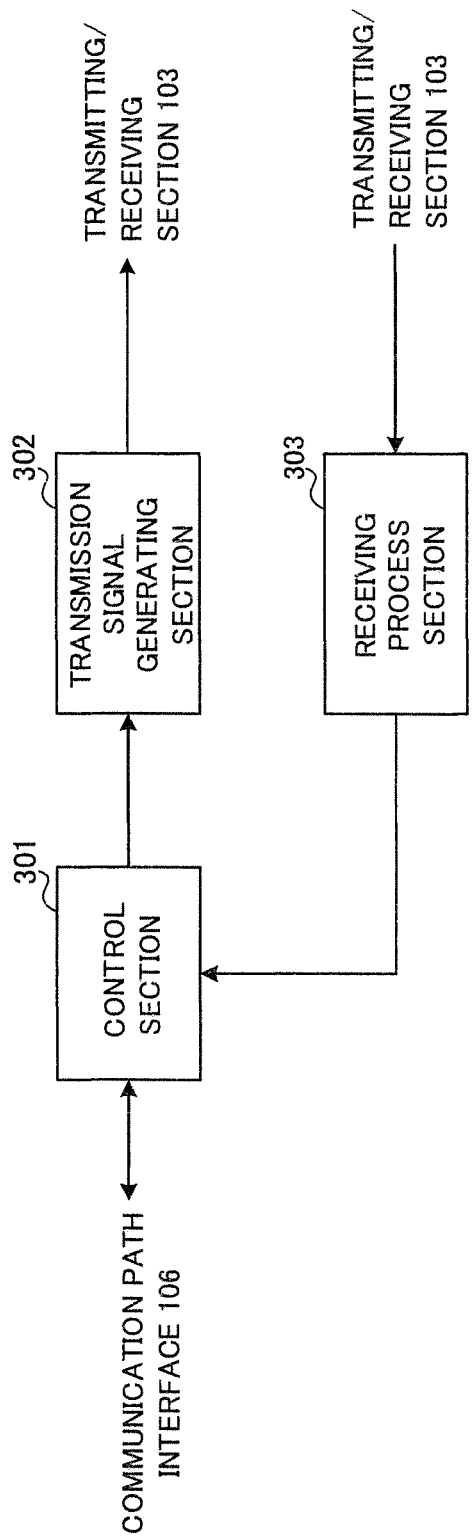
FIG. 10 is a diagram to show an example of a functional structure of a radio base station according to the present embodiment.

FIG. 10 is a diagram to show a principle functional structure of the baseband signal processing section 104 provided in the radio base station 10 according to the present embodiment. Note that, although FIG. 10 primarily shows functional blocks that pertain to characteristic parts of the present embodiment, the radio base station 10 has other functional blocks that are necessary for radio communication as well.

As shown in FIG. 10, the radio base station 10 is comprised at least of a control section (scheduler) 301, a transmission signal generating section 302 and a receiving process section 303.

The control section 301 controls the scheduling of downlink data signals that are transmitted in the PDCCH, and downlink control signals that are communicated in the PDCCH and/or the enhanced PDCCH (EPDCCH). Also, the control section (scheduler) 301 controls the scheduling of downlink reference signals such as system information, synchronization signals, the CRS, the CSI-RS and so on. Furthermore, the control section 301 also controls the scheduling of uplink reference signals, uplink data signals that are transmitted in the PUSCH, and uplink control signals that are transmitted in the PUCCH and/or the PUSCH. Note that the control section 301 can be constituted by a controller, a control circuit or a control device that is used in the technical field to which the present invention pertains.

Also, the control section 301 can control the transmission signal generating section 302 to control the CCs to be subject to measurements in the user terminals 20 connected with the radio base station 10. To be more specific, the control section 301 exerts control so that information about the CCs included in each TAG is reported to the transmission signal generating section 302, and a signal to contain this CC information (for example, higher layer signaling) is generated (first example). Furthermore, the control section 301 exerts control so that the measurement gap configurations, which are configured on a per TAG basis, are reported to the transmission signal generating section 302, and a signal to contain the measurement gap configurations (for example, higher layer signaling) is generated (second example).

The transmission signal generating section 302 generates DL signals (downlink control signals, downlink data signals, downlink reference signals and so on) based on commands from the control section 301. For example, based on information about the CCs included in each timing advance group (TAG), reported from the control section 301, the transmission signal generating section 302 generates a signal that contains this CC information (first and second example). In this case, the transmission signal generating section 302 can generate a signal that contains a TAG-CC list (first and second example). Also, based on measurement gap configurations, which are configured on a per TAG basis and reported from the control section 301, the transmission signal generating section 302 generates a signal to contain these measurement gap configurations (second example). These pieces of information are reported to the user terminals 20 via the transmitting/receiving sections 103, by using higher layer signaling (for example, RRC signaling, broadcast signals and so on), downlink control signals and so on. Note that the transmission signal generating section 302 can be constituted by a signal generator or a signal generating circuit that is used in the technical field to which the present invention pertains.

The receiving process section 303 performs the receiving process (for example, demapping, demodulation, decoding and so on) of UL signals (uplink control signals, uplink data signals, uplink reference signals and so on) transmitted from the user terminal 20. For example, the receiving process section 303 performs the receiving process (measurements of the received power (RSRP), channel states, etc.) to the measurement results transmitted from the user terminal 20. To be more specific, the receiving process section 303 performs the receiving process of the measurement results of each TAG, transmitted from the user terminal 20 (first example). Also, the receiving process section 303 performs the receiving process of the measurement results of each CC transmitted from the user terminal 20 (second example). Then, the receiving process section 303 outputs the measurement results after the receiving process to the control section 301. Note that the receiving process section 304 can be constituted by a signal processor or a signal processing circuit that is used in the technical field to which the present invention pertains.

Figure 11:
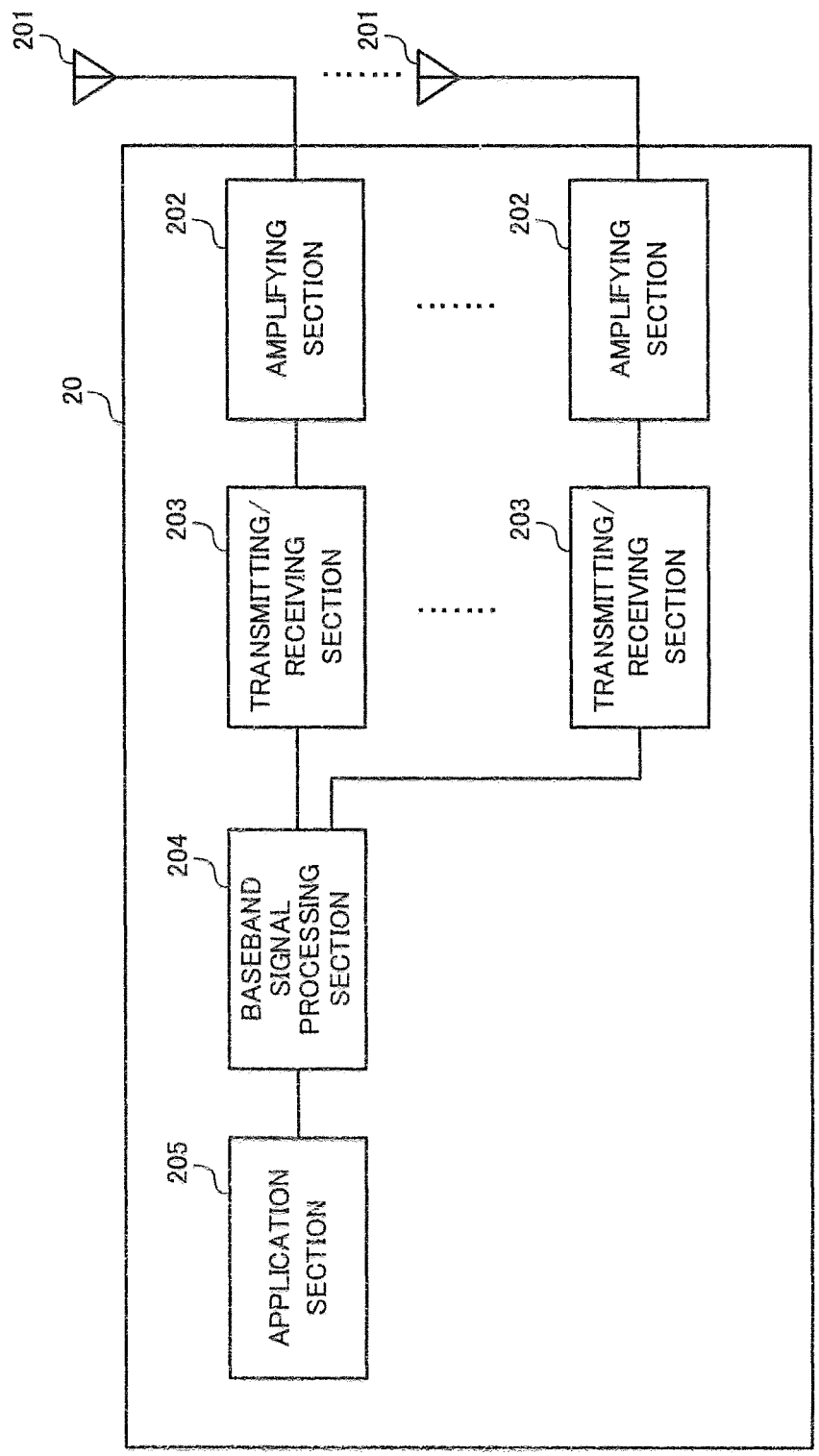
FIG. 11 is a diagram to show an example of an overall structure of a user terminal according to the present embodiment.

FIG. 11 is a diagram to show an example of an overall structure of a user terminal according to the present embodiment. As shown in FIG. 11, the user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving section 203, and output to the baseband signal processing section 204. The transmitting/receiving sections 203 can be constituted by transmitters/receivers, transmitting/receiving circuits or transmitting/receiving devices that are used in the technical field to which the present invention pertains.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 can transmit and receive signals with radio base stations that configure TAGs comprised of one or more cells. Also, the transmitting/receiving sections 203 can transmit and receive signals to and from a plurality of radio base stations that each configure a cell group (CG) comprised of one or more cells.

Figure 12:
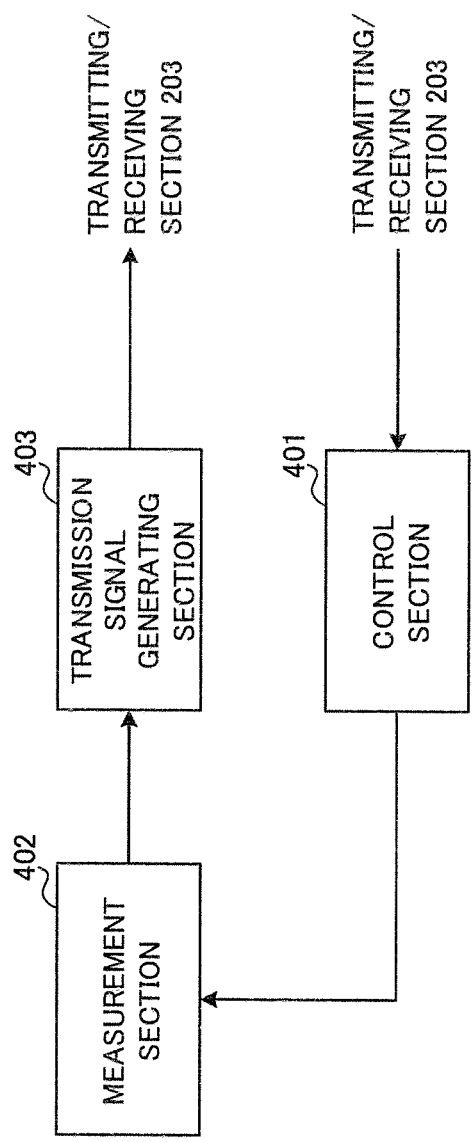
FIG. 12 is a diagram to show an example of a functional structure of a user terminal according to the present embodiment.

FIG. 12 is a diagram to show a principle functional structure of the baseband signal processing section 204 provided in the user terminal 20. Note that, although FIG. 12 primarily shows functional blocks that pertain to characteristic parts of the present embodiment, the user terminal 20 has other functional blocks that are necessary for radio communication as well.

As shown in FIG. 12, the user terminal 20 is comprised at least of a receiving process section 401, a measurement section 402 and a transmission signal generating section 403.

The receiving process section 401 performs the receiving process (for example, demapping, demodulation, decoding and so on) of DL signals transmitted from the radio base station 10. The receiving process section 401 performs the receiving process of the signal that contains information about the CCs included in each TAG, transmitted from the radio base station 10 (first and second example). For example, the receiving process section 401 performs the process of the signal that contains a TAG-CC list, transmitted from the radio base station 10 (see FIG. 5A and FIG. 5B). Also, the receiving process section 401 performs the receiving process of the signal that contains measurement gap configurations that vary on a per TAG basis (second example). Then, the receiving process section 401 outputs the CC information (TAG-CC list) and the measurement gap configurations that vary per TAG, after the receiving process, to the measurement section 402. Note that the receiving process section 401 can be constituted by a signal processor or a signal processing circuit that is used in the technical field to which the present invention pertains.

The measurement section 402 acquires the CC information (TAG-CC list) and the measurement gap configurations that vary per TAG form the receiving process section 401. The measurement section 402 makes measurements on a per TAG basis based on the CC information (TAG-CC list) (first example). For example, the measurement section 402 makes measurements for specific CCs included in each TAG. Also, the measurement section 402 makes measurements per CC included in each TAG, based on the MGL, the MGRP and the GO configured in the measurement gap configurations (second example). Then, the measurement section 402 outputs the measurement results the transmission signal generating section 403, per TAG or per CC included in each TAG.

Note that the measurement section 401 can be a measurer or a measurement circuit used in the technical field to which the present invention pertains.

The transmission signal generating section 403 generates signals that contain information related to measurements, to the radio base station 10. For example, the transmission signal generating section 403 generates a signal that contains the measurement results output from the measurement section 402. The transmission signal generating section 403 generates a signal that contains the measurements of each TAG (first example). In this case, the transmission signal generating section 403 can generate a signal that contains all measurement results of specific CCs included in each TAG, a signal that contains the measurement result to show the worst performance, and so on. Also, the transmission signal generating section 403 generates a signal that contains the measurement results of each CC included in each TAG (second example). These signals containing measurement results are transmitted to the radio base station 10 via the transmitting/receiving sections 203.

Furthermore, when the measurement section 402 can measure a plurality of CCs by performing the measurement process once, the transmission signal generating section 403 generates a signal that contains the number of CCs that can be measured together (first example). The signal to contain this number of CCs is transmitted to the radio base station 10 via the transmitting/receiving sections 203. Note that transmission signal generating section 403 can be constituted by a signal generator or a signal generating circuit that is used in the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2014-226467, filed on Nov. 6, 2014, including the specification, drawings and abstract, is incorporated herein by reference in its entirety.

The invention claimed is:

1. A terminal that communicates with a radio base station that configures groups comprised of one or more cells, the terminal comprising:
   a receiver that receives information related to the cells included in the groups; and
   a processor that makes measurements of at least one cell per group based on the information related to the cells, wherein the measurements are performed per group basis, and for at least one of the groups, the processor makes measurements on the group by measuring a specific cell included in the group based on the information, and the at least one of the groups includes a plurality of the cells,
   wherein the receiver receives identification information of the specific cells as the information related to the cells, wherein the processor makes measurements for the specific cells based on the identification information, and wherein the processor makes measurements based on varying measurement gaps configured per group.

2. The terminal according to claim 1, further comprising a transmitter that transmits information related to measurements to the radio base station that configures the groups, wherein the transmitter transmits measurement results of the specific cells.

3. The terminal according to claim 2, wherein the transmitter transmits the number of cells in each group that can be measured together in the processor.

4. The terminal according to claim 1, wherein, based on the information related to the cells, the processor makes at least one of RRM measurements, CSI measurements, RRM measurements and time or frequency synchronization tracking for CSI measurements.

5. A radio base station that configures groups comprised of one or more cells, and communicates with a terminal, the radio base station comprising:
   a transmitter that transmits information related to the cells included in the groups; and
   a receiver that receives results of measurements, made on at least one cell per group, from the terminal,
   wherein the measurements are performed per group basis, and for at least one of the groups, the terminal makes measurements on the group by measuring a specific cell included in the group based on the information, and the at least one of the groups includes a plurality of the cells, wherein the terminal receives identification information of the specific cells as the information related to the cells, wherein the terminal makes measurements for the specific cells based on the identification information, and wherein the terminal makes measurements based on varying measurement gaps configured per group.

6. A radio communication method for use between a radio base station that configures groups comprised of one or more cells and a terminal, the radio communication method comprising, in the terminal, the steps of:

receiving information related to the cells included in the groups; and making measurements of at least one cell per group based on the information related to the cells, wherein the measurements are performed per group basis, and for at least one of the groups, the terminal makes measurements on the group by measuring a specific cell included in the group based on the information, and the at least one of the groups includes a plurality of the cells, wherein the method further comprises receiving identification information of the specific cells as the information related to the cells, wherein the measurements for the specific cells are performed based on the identification information, and wherein the measurements are performed based on varying measurement gaps configured per group.

7. A system for use between a radio base station that configures groups comprised of one or more cells and a terminal that communicates with the radio base station, the system comprising:

the terminal comprising:
  a first receiver that receives information related to the cells included in the groups; and
  a processor that makes measurements of at least one cell per group based on the information related to the cells,
  wherein the measurements are performed per group basis, and for at least one of the groups, the processor makes measurements on the group by measuring a specific cell included in the group based on the information, and the at least one of the groups includes a plurality of the cells,
  wherein the first receiver receives identification information of the specific cells as the information related to the cells,
  wherein the processor makes measurements for the specific cells based on the identification information, and
  wherein the processor makes measurements based on varying measurement gaps configured per group; and the radio base station comprising:
  a transmitter that transmits information related to the cells included in the groups; and
  a second receiver that receives results of measurements, made on at least one cell per group, from the terminal, wherein the measurements are performed per group basis, and for at least one of the groups, the terminal makes measurements on the group by measuring a specific cell included in the group based on the information, and the at least one of the groups includes a plurality of the cells, wherein the terminal receives identification information of the specific cells as the information related to the cells, wherein the terminal makes measurements for the specific cells based on the identification information, and wherein the terminal makes measurements based on varying measurement gaps configured per group.

* * * * *